United States Patent
Fromherz

[19]

[11] Patent Number: 6,097,500

[45] Date of Patent: Aug. 1, 2000

[54] OPERATION SCHEDULING SYSTEM FOR A DIGITAL PRINTING APPARATUS, WHERE NEW CONSTRAINTS CAN BE ADDED

[75] Inventor: Markus P. J. Fromherz, Palo Alto, Calif.

[73] Assignee: Xerox Corporation, Stamford, Conn.

[21] Appl. No.: 09/005,672

[22] Filed: Jan. 12, 1998

[51] Int. Cl.$^7$ .................................................. G06F 15/00
[52] U.S. Cl. .......................... 358/1.8; 358/1.15; 399/352; 399/364
[58] Field of Search .................................. 358/1.12, 1.13, 358/1.15, 1.2, 296; 355/308, 319; 399/352, 361, 364, 367

[56] References Cited

U.S. PATENT DOCUMENTS

| | | | |
|---|---|---|---|
| 5,504,568 | 4/1996 | Saraswat et al. | 358/1.12 |
| 5,528,375 | 6/1996 | Wegeng et al. | 358/296 |
| 5,557,367 | 9/1996 | Yang et al. | 355/202 |
| 5,729,790 | 3/1998 | Conley et al. | 358/1.12 |

Primary Examiner—Edward L. Coles
Assistant Examiner—Mark Wallerson
Attorney, Agent, or Firm—R. Hutter

[57] ABSTRACT

A scheduling system determines the order of specific operations in a printing apparatus which is capable of outputting simplex or duplex prints. If the actuation of a module associated with the apparatus, such as stapling or switching paper supplies, requires a delay in the operation of the apparatus, this delay is entered as at least one deliberately blank pitch in the schedule. The scheduling system creates a special finite state machine which can take into account delays of arbitrary length caused by the actuation of one or more modules.

15 Claims, 3 Drawing Sheets

OPERATION SCHEDULING SYSTEM FOR A DIGITAL PRINTING APPARATUS, WHERE NEW CONSTRAINTS CAN BE ADDED

INCORPORATION BY REFERENCE

The following U.S. patent is incorporated by reference: 5,504,568, assigned to the assignee hereof. Also incorporated by reference is U.S. patent application serial number 08/787,188, which was allowed as of the filing hereof.

FIELD OF THE INVENTION

The present invention relates to a system for scheduling operations in a printing machine capable of producing single-sided (simplex) and double-sided (duplex) prints. Specifically, the present invention relates to scheduling such operations when the addition of extra physical modules to the machine adds new scheduling constraints.

BACKGROUND OF THE INVENTION

On-demand page printers, wherein images are created in response to digital image data submitted to the printing apparatus, are familiar in many offices. Such printers create images on sheets typically using electrostatographic or ink-jet printing techniques. In work-group situations, wherein different users at various personal computers and other terminals submit jobs to a single central printing apparatus, various sets of digital image data, corresponding to jobs desired to be printed by different users, are typically kept in an electronic queue, and a control system typically located at the printer sorts through the image data and causes the printer to output the desired prints in an orderly manner.

Particularly with sophisticated printing apparatus, it may often be desired to print "duplex" prints, that is prints having images on both sides of the sheet. However, just about every currently commercially available printing apparatus is capable of producing an image only on one side of a sheet at a time. In order to obtain duplex prints, it is almost always necessary to provide an "inverter" within the printing apparatus. The purpose of an inverter is to handle a sheet after one side thereof has received an image, and in effect turn the sheet over to make the remaining blank side available to the same printing apparatus which created the first image. In effect, each duplex print is re-fed past the image-making portion of the printing apparatus so that the individual sheet becomes available to the image-making apparatus twice, once for each side.

A long-standing concern of designers of printing apparatus is how to optimize the use of a printing apparatus for situations wherein some desired prints are simplex and others are duplex. The fact that each duplex print has to be printed essentially twice causes a significant systemic problem with maintaining optimal or near-optimal operation of the entire printing apparatus. One simple solution, for example, would be to run every sheet along the duplex path, regardless of whether it is a simplex or duplex print, and in the case of each simplex print simply print nothing on the back side. While this solution is easy to implement, it provides the disadvantages of unnecessarily decreasing the output speed of the whole system. Another solution is to maintain duplex prints which are awaiting printing on the back sides thereof in a special buffer tray, until the system becomes available for printing the back sides of each sheet in sequence. The key disadvantage of this system is that a significant probability of error exists (a sheet may have the incorrect back side image placed thereon), and also the relatively intense handling of each print sheet in and out of the buffer tray substantially increases a likelihood of mechanical misfeed. Both such problems tend to result from the fact that sheets typically cannot be fed out of the buffer tray reliably. Even with a buffer tray, a fairly sophisticated scheduling system is required.

In electrostatographic printing apparatus, wherein images are first created on a photoreceptor in the form of a rotating drum or belt and then transferred to sheets, a key concern is the presence of blank pitches (image-sized spaces) along the drum or belt where, for various reasons relating to duplexing, no image is created. The problem with blank pitches is that each blank pitch represents lost productivity. In some duplexing schemes, the number of blank pitches along the belt may be comparable to the number of pitches actually having images on them. In such a situation, not only is the apparatus effectively running at half-speed, but various mechanical parts associated with the drum or belt experience wear to no productive purpose. Thus, as a general rule, the overall productivity of such printing apparatus is closely related to the number of blank pitches which result in the printing process.

The prior art incorporated by reference above proposes a scheduling system for minimizing the number of required blank pitches in a duplex printing apparatus. In the specific examples given therein, a digital printing apparatus was shown with a trayless duplex loop or duplex path. This architecture of the printing apparatus determines the appearance of what was called "simplex" or "duplex" blocks, meaning portions of a schedule in which either a simplex image was created on a sheet, or two duplex images were created on the sheet. These various blocks were then arranged according to various techniques in order to result in the desired output of simplex and duplex prints, taking into account the constraints of the duplex path. However, when modules are added to the printing machine beyond the architecture of the duplex path, new scheduling constraints are created by the added modules, and these constraints must be taken into account. For instance, if there is provided a stapler immediately downstream of the general printing apparatus, the operation of the stapler will have to be taken into account by the overall scheduling system in various ways. For example, the schedule must ensure that, first, sheets which are to be stapled in a first set are not commingled with sheets to be stapled in a second set, and second, sheets are not pushed into the stapler while the stapler is being actuated, which would probably cause jamming.

It is an object of the present invention to provide a scheduling system which can adapt to new constraints imposed by the addition of further physical modules to the printing machine.

DESCRIPTION OF THE PRIOR ART

US-A-5,528,375 discloses an implementation of scheduling page-side images in a high-volume electrophotographic printer capable of outputting simplex and duplex prints. The method includes the steps of building a scheduling list indicating an order in which images in the job are to be printed. An indication can be provided in the scheduling list when image data for a particular image is available in memory.

US-A-5,557,367 discloses a method of scheduling the operation of hardware modules in a duplex printing apparatus, using a system of accumulating constraints which satisfy criteria associated with a particular print job.

SUMMARY OF THE INVENTION

According to one aspect of the present invention, there is provided a method of developing a schedule for operations in an apparatus for outputting prints. A schedule space is provided defining a series of pitches, the apparatus being capable of performing an operation within each pitch. For each print to be output at least one possible schedule extension is created, this schedule extension ending in a basic state. Each schedule extension includes a block representative of the print to be output and a predetermined offset relative to an ending of a schedule of previously-scheduling blocks in the schedule space. A basic state is an ending of the schedule having reserved pitches related to only one print to be output within a reachback of a predetermined length. A first new possible schedule extension is proposed having a first predetermined offset between the previously-scheduled blocks in the schedule space and the basic state. It is then determined whether the first new possible schedule extension is consistent with outputting the print in view of a timing constraint.

According to another aspect of the present invention, there is provided a method of developing a schedule for operations in an apparatus for outputting prints. A schedule space defining a series of pitches is provided, the apparatus being capable of performing an operation within each pitch. For each simplex print to be output, a simplex block indicative of printing the simplex print is entered into the schedule space. For a step of actuating a module associated with the apparatus, there is entered into the schedule space at least one offset pitch representative of a delay in operation of the apparatus.

According to another aspect of the present invention, there is provided a method of developing a schedule for operations in an apparatus for outputting prints, the apparatus including a rotatable belt including a seam. A schedule space defines a series of pitches, the apparatus being capable of performing an operation within each pitch. For each print to be output, a block indicative of printing the print is entered to the schedule space. At least a first proposed extension and a second proposed extension to the schedule of operations are generated, the first proposed extension describing the seam being in a first position relative to a block, and the second proposed extension being identical to the first proposed extension but for describing the seam being in a second position relative to the block.

As used in certain of the claims herein, print sheets will be referred to as either "simplex" or "complex" prints. In the described embodiment of the present invention, the method is applied to the creation of duplex sheets, that is, sheets having a first image printed on one side and a second image printed on another side. However, in other possible embodiments of certain of the claims hereinbelow, the claimed principles could be applied to other printing tasks in which multiple images are printed on a sheet, such as when different primary-color images are printed on the same side of a sheet to yield a full-color image. For this reason, what is described as "duplex blocks" in the specification can be generalized to "complex blocks" in the claims.

DETAILED DESCRIPTION OF THE INVENTION

A. Duplex printing apparatus

Figure 1:
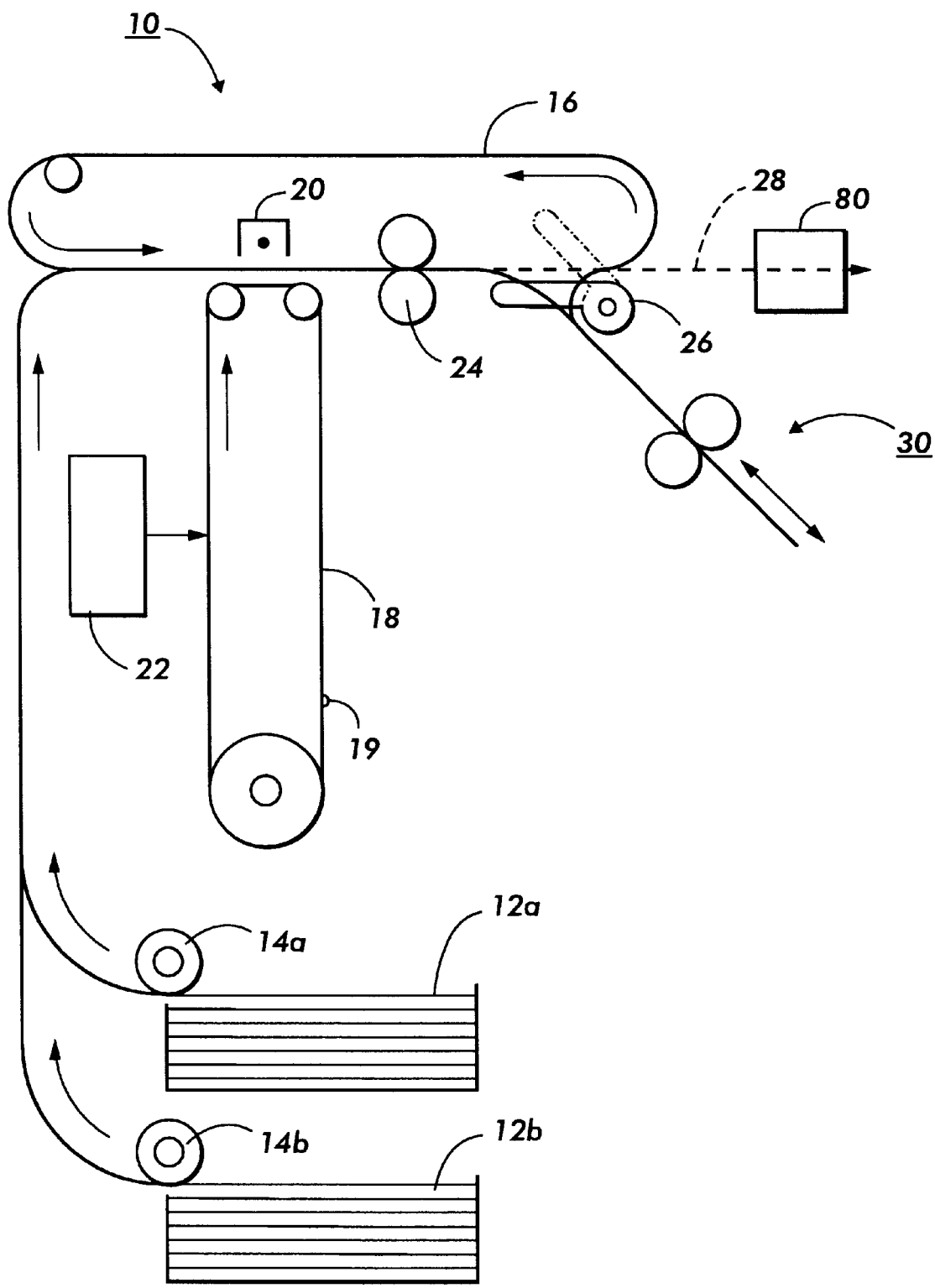
FIG. 1 is a simplified elevational view showing the relevant parts of a duplex printing apparatus, on which the system of the present invention may operate.

FIG. 1 is a simplified elevational view of the paper path of an on-demand printing apparatus, capable of simplex or duplex output, in which a stream of digital video signals representative of images desired to be printed causes the desired images to be formed on a selected side of a print sheet. The particular architecture shown in FIG. 1 is for an electrostatographic printer, but it will be understood that the principle of the invention could apply equally to other types of image-creation technologies, such as ink-jet printing. The printing apparatus, generally indicated as 10, contains one or more stacks of available sheets on which to print images, these stacks being indicated as 12a and 12b. The sheets of paper in the stacks 12a and 12b may differ in, for example, size, color, or the presence of a pre-printed letterhead. When it is desired to create an image on a sheet, a sheet of a desired type is drawn from a stack such as 12a or 12b, such as by respective feeders 14a, 14b, and the individual sheet is fed onto duplex loop 16.

Duplex loop 16 is typically in the form of an endless belt which is capable, by means of friction, static electricity, vacuum, or other means, of retaining a plurality of sheets thereon, thereby retaining a particular sheet until it is time for the sheet to receive an image on the side of the sheet facing outwardly from the belt of the duplex loop 16. In the architecture shown in FIG. 1, it is intended that sheets "ride" on the outer surface of the belt of duplex loop 16. Along one portion of duplex loop 16, the belt of duplex loop 16 comes into close contact with a photoreceptor belt indicated as 18. At the point of close proximity of duplex loop 16 and photoreceptor belt 18, there may be provided a transfer corotron 20, the function of which will be familiar to one of skill in the art of xerography.

In the xerographic-based embodiment of a printing apparatus shown in FIG. 1, a device which shall be here generally referred to as an "imager" creates an electrostatic latent image on the surface of photoreceptor 18. Imager 22 has the function of receiving a sequence of digital signals representative of the desired image to be printed, and outputs a physical manifestation, such as a modulated laser scanning beam, to imagewise discharge selected areas on the photoreceptor 18 to create an electrostatic latent image representative of the image desired to be printed. As is known in the art of electrophotography, other stations along the path of photoreceptor 18, such as a charging bar and development unit (not shown) are also required to create the desired developed image on the photoreceptor belt 18. This developed image, which is typically in the form of a reverse image in toner particles on the photoreceptor 18, is then made available to a sheet which rides on the outer surface of duplex loop 16.

After an image is created on the photoreceptor belt 18 by imager 22, and developed (by means not shown), the motion of photoreceptor belt 18 causes the developed toner image to be in close proximity or in contact with a sheet, originally from stack 12a or 12b, which is riding on the outer surface of duplex loop 16. At transfer corotron 20, the toner particles arranged in imagewise fashion on photoreceptor 18 are electrostatically transferred to the surface of the sheet by transfer corotron 20. Soon thereafter along the path of duplex loop 16, the toner image on the sheet is passed through a fuser 24, which causes the toner image to be fixed permanently on the outer surface of the sheet, in a manner known in the art. Thus, immediately downstream of fuser 24, there will be created a sheet having a desired image on the side thereof which faces outward along the duplex loop 16. If at this point the sheet having the image thereon is desired to be output from the system, a device such as router 26, a simple design of which is shown in FIG. 1, but which may be of any number of designs known in the art, will cause the sheet to be disengaged from the duplex loop 16 and output from the printer such as through the path indicated by arrow 28. This output sheet can either be directly output into a tray for pickup by the user, or may be sent to a sorting or stapling device according to the larger architecture of the printing apparatus.

To create a duplex print, that is, a print having one desired image on one side thereof and another desired image on the other side thereof, it is necessary to make the other side of the sheet available to the photoreceptor belt 18, by causing the other side of the sheet to face outward while the sheet rides on the outside of duplex loop 16. For this purpose there is provided along the duplex loop 16 a device generally indicated as inverter 30. The basic purpose of inverter 30 is to pick off a sheet from duplex loop 16 which has an image already placed on the outward-facing side thereof, and in effect turn the sheet over so the other, "non-printed" side of the sheet faces outward as duplex loop 16 re-feeds the sheet for another cycle so that photoreceptor belt 18 can place another desired image on the other side thereof. In brief, inverter 30 operates by temporarily removing the sheet from the duplex loop, feeding it in one direction, and then re-feeding it back onto the duplex loop 16, such as indicated by the double-headed arrow next to inverter 30. Various designs of an inverter 30 are available to one of skill in the art. Once again, the purpose of the device shown as router 26 would be to selectably cause the sheet to be output along path 28, or to enter inverter 30, depending on whether the particular sheet passing therepast is a simplex print, the first side of a duplex print, or the second side of a duplex print.

Returning to imager 22, it will be evident that the stream of video signals being entered into imager 22 must relate to the desired sequence of simplex and duplex images to be created on photoreceptor 18 and ultimately transferred to one side or another of the sheet being fed along duplex loop 16. The physical configuration of duplex loop 16 mandates that the images placed on sheets around the duplex loop 16, and therefore images placed on photoreceptor belt 18 by imager 22, must be placed in an order such that, for a duplex print, an image placed on one side of a particular sheet at one time will determine when the inverted sheet is available for placement of a desired image on the other side of the sheet.

Shown in a somewhat exaggerated form in FIG. 1 is a seam, indicated as 19, which forms part of the belt of photoreceptor 18. The location of the seam 19 is of some importance in a design of a printing apparatus having a multi-pitch photoreceptor belt 18. In the case where, for example, photoreceptor belt 18 is of a size to accommodate two 8.5×11 letter-sized images, or a single 11×17 image, it is important that any 11×17 inch image be placed on the photoreceptor belt 18 in a position which avoids the seam 19: otherwise, the seam 19 will be positioned directly through the middle of the 11×17 image, resulting in an unacceptable print. If the photoreceptor belt 18 is of size to accommodate three 8.5×11 images, it will be apparent that there would be two possible locations of an 11×17 image (essentially, a two-pitch image) on the three-pitch belt, either just "before" or just "after" the seam 19, in either case the two letter-sized pitches of the 11×17 image leaving one letter-sized blank image as a remainder. Paying attention to the location of the seam 19 will affect the precise scheduling of different-sized images, as will be described below. (As used in the claims herein, the word "seam" is intended to apply to any structure in a fixed position on a rotatable belt or drum, such as but not limited to a charge-receptive image-bearing belt within a printing apparatus.)

It will be noted that the specifically electrostatographic aspects of the apparatus shown in FIG. 1, such as the photoreceptor 18, imager 22, and transfer corotron 20, could be replaced by equivalent apparatus for other techniques for creating images on one side of a sheet, such as an ink-jet printhead. Also, imager 22 as here described assumes that the user has unlimited control over the order of page images (the "digital video") being output through imager 22. If, however, the original source of images to be created is itself a set of automatically fed hard-copy images, i.e. if the printing system as a whole is operating as a copier, the feeding of originals will also create certain constraints on the optimal order of images created with the printer. It is probably preferable to digitize (convert to digital signals) the original hard-copy images, electronically store the resulting data, and apply the data as required to a digitally-based imager 22.

In the particular embodiment shown in FIG. 1, it is evident that, after a front-side image is placed on a sheet at transfer corotron 20, this sheet is picked off duplex loop 16 by router 26, inverted by inverter 30, and placed back on duplex loop 16, where the inverted sheet will again become available to receive an image from photoreceptor 18 at a time in the future after the inverted sheet makes its way around duplex loop 16. Thus, for a duplex print, the creation of the front-side image by imager 22 must be spaced by a fixed time period from the creation of the back-side image on the same sheet; this time difference is ultimately dependent on the size of the sheet relative to the overall length of the duplex loop 16. Given a fixed-speed paper path, the only sheet-size-related difference is due to the inverter 30; if a longer sheet has to be driven farther into inverter 30 to invert the sheet, the extra length in and out of inverter 30 changes the length of the duplex path. If the duplex loop 16 is longer, will be more time will be required for the back side of the sheet to come around to photoreceptor 18, and therefore a longer time spacing would be required between the outputting of the front-side image from imager 22 and the back-side image.

In a practical application of a duplex printer, an operating parameter which is more useful than the timing between the production of particular images is the number of "pitches" along the length of either the photoreceptor belt or the duplex loop. A "pitch" is a convenient measurement unit (e.g., used to measure the length of the duplex loop or photoreceptor belt) corresponding to an image of the size to be printed, such as 8.5×11 inches or "A4". For example, a typical practical length of a duplex loop 16 is four pitches; that is, for letter-sized images to be printed, the duplex loop 16 is of a length wherein four such images, or four such sheets, could be retained on the duplex loop 16 at a particular time along the circumference thereof. What this also means is that duplex loop 16 is capable of, in effect, temporarily storing up to four such sheets at a time between the time any individual sheet receives an image on one side thereof and gets ready to receive an image on the other side thereof. This "capacitance" of the duplex loop 16 will of course have a direct effect on the spacing, and number of pitches, between the output of a front-side image by imager 22 and a back-side image for the sheet from imager 22. It will also be apparent that, if a larger size print, such as 11×17 inches, is desired to be printed, the effective capacitance of duplex loop 16 will be lower, such as two or three pitches, because only two or three such large sheets could be retained along the circumference of duplex loop 16 at a particular time.

B. Scheduling of simplex and duplex prints

Having explained the physical parameters of a duplex-capable printing apparatus capable of being optimally controlled by the system of the present invention, attention is now directed to the specific techniques according to the present invention. In a networked printing environment, it is likely that any number of a large population of users may at any time access the printer 10 for printing of various jobs which may be duplex, simplex, or a combination of the two. As mentioned above, for efficient long-term use of the printer 10, it is desired that this incoming stream of jobs to be printed be organized such that a minimum of the resources of the printer 10 are wasted. In practical terms, this optimal usage translates into a minimal use of blank pitches along the length of photoreceptor 18. Any blank pitch along photoreceptor belt 18 represents a wasted resource, in that a blank pitch could conceivably have been put to use in producing a desired image. It is a key function of the system of the present invention to create an optimal schedule of images to be output by imager 22 to optimize the function of the entire printing apparatus 10.

In order to perform this scheduling function, according to the present invention there is provided a data structure, such as a portion of computer memory, which retains instructions for the imager 22 on which of an available set of images to be printed are to be printed at a given time and in what sequence. In this available memory space, a schedule is constructed in an ongoing manner. This schedule is a continually-changing list of which page images will be placed on the photoreceptor 18 by imager 22 in the immediate future.

Every time a request to print a simplex or duplex sheet is received by the control system of the printing apparatus, there is entered into the schedule a "block" corresponding to the print desired to be printed. The nature of this block will depend on whether a simplex or a duplex print is desired. For a simplex block the imager 22 is concerned with the printing of only one image, and therefore the schedule need require a unitary block, which can be rendered as s. For every duplex print desired to be printed, the block entered into the schedule will have two parts, representative of the front (f) and back (called d, in reference to being the final image in the duplex print) image on the same sheet. This "duplex block" will appear as something like f - - - d, with the dashes representing available empty pitches between the creation of the front image f and the back image d.

The duplex loop length is the distance from start of the front page to start of the back page. In the particular example shown, the duplex block f - - - d corresponds to a duplex loop 16 having four pitches; after the front image f is created, the imager 22 must wait for three blank pitches to print the back image d. If, for example, the relative sizes of the images to be printed and the duplex loop were seven pitches per duplex loop, the duplex block may look like f - - - d, and if the duplex loop were three pitches in length, the duplex block would look like f - - - d. The varying total length (in pitches) of the duplex block relates directly to how long a sheet will travel on duplex loop 16 before it moves past the transfer corotron 20 again to receive another image.

In determining how many pitches exist between the f and d blocks within the duplex block, other physical considerations may have to be taken into account, such as the amount of leftover space when documents of a particular size are placed on the duplex loop. If sheets of different sizes are desired to be mixed along the duplex loop, it might be necessary to assign a finite length to a block or a portion of a block: for instance an 11×17 sheet will in effect take up two "normal" 8.5×11 pitches on the duplex loop, and the blocks representative thereof must reflect this. Also, the position and behavior of the inverter may also have an effect on the exact nature of different duplex blocks; for example, the time spent for a sheet entering and exiting the inverter 30 may have the effect of adding one or more pitches along the duplex loop 16.

Taking the four-pitch embodiment of a duplex loop as the example, it will be noted that the three blank pitches between the f and d images in the duplex block are potentially available for the creation of images of other prints. These blank pitches appear not only along the circumference of the duplex loop 16, but also the photoreceptor belt 18. If the blank pitches between the f and d blocks for each duplex image can be utilized to print other pages, fewer blank pitches will be necessary and therefore the system as a whole will be faster and more efficient. Thus, if one wished to print three consecutive duplex prints, one could concatenate the three f - - - d blocks as f f f - d d d. By having the imager 22 output the sequence of images in this way, almost the full capacitance of the duplex loop is utilized, with only the one blank pitch in the middle being required to maintain the proper spacing between the f and d of each f - - - d block.

When producing a mix of simplex and duplex prints, either within a single job, or where one type of job immediately follows a job of the other type, it will also be possible to insert simplex images in the blank pitches between the f and d images of a duplex job, such as to create a sequence f—ssd. As it happens with the particular hardware architecture shown in FIG. 1, the requirements of the inverter 30 are such that a simplex print s cannot immediately follow the creation of a portion of a duplex print f or d. Thus, in the sequence of prints output by the printer 10, and thus also by imager 22, the sequences f s and d s are physically impermissible. Further, in one embodiment of a printing apparatus similar to that shown in FIG. 1, the sequence f d is physically impermissible as well. These physical constraints on certain sequences can be built into the control system of the present invention, in a manner which will be described in detail below.

To take an example of combined simplex-duplex printing for a particular job, consider a case in which the desired output is a simplex print, followed by a duplex print, then another simplex print, and finally another duplex print; or in shorthand s d s d. It will be noted that every ultimate output of the printer 10 must be either a simplex print s or the second side d of a duplex print. In this case, one best solution to the problem of assigning photoreceptor and duplex loop pitches in the printer would be to have the imager 22 output the images as f - - - sdf - s - d. It will be noted that this sequence of prints retains the sdsd final sequence of desired print outputs, while also preserving the f - - - d spacing between duplex images, and also avoids the impermissible f s, d s, and f d sequences which are prohibited by the physical structure of the inverter 30. Incidentally, to take another example of another physical architecture, wherein the fd sequence happened to be permissible, then an even more efficient (i.e., fewer blank pitches) sequence would be possible: f - sfd - sd. Once again, the sdsd sequence of prints as they are output is here preserved. It is the function of the optimization step of the present invention to obtain the most efficient sequence of s, f, and d image creation given a particular desired final output of simplex and duplex prints such as s d s d.

Because in the networked-printer context, requests for printing various simplex or duplex prints will enter the control system essentially randomly, an optimization technique for determining the most efficient sequence of f, d, and s images will have to reassess the most efficient sequence given both its current state of prints it has already committed to making, and the addition of each new print which is desired to be printed. Generally, different embodiments of the present invention rely on one or both of the following optimization techniques: the "greedy-algorithm" technique, and the "forward reach-back" technique. The greedy-algorithm technique can further be divided into a forward greedy-algorithm technique and a backward greedy-algorithm technique. These techniques are described in detail in the patent incorporated by reference above, but the reach30 back technique will be here briefly recapitulated.

In the reach-back optimization technique, the control system looks at the present allocation of the last four pitches in the currently-scheduled list of images to be created and then determines whether or not the new s (for a simplex image requested) or f - - - d (for a duplex print requested) can be placed at a given offset, taking into account both the requirement of adding a minimum number of blank pitches, and also the physical constraints such as avoiding the f s, d s, or f d sequences. As used herein, the term "offset" refers to the selection of which available blank pitch receives the new block added to the schedule. For example, when scheduling in the forward direction, if the end of the schedule is f - - - d, a new s could be added at zero offset to make the new ending f - - - d s, while placing the s at offset one would make the schedule f - - - d - - - s, and placing the s at offset two could make the schedule f - - - d - - - s. The significance of the "offset" concept will become apparent as the invention is described in detail below.

Every new block added to an ongoing schedule is fit into the end of the sequence of prints to be made, with the number of possible variations to the schedule being less than or equal to the number of pitches in the reachback. What makes the forward reach-back work is that it proactively accounts for blocks that might get placed in the schedule later. For example, if the last pitch spaces in the sequence are f - - - d, a subsequent block could fit into four possible blank spaces (i.e., one of the blank pitches within the block, or a position after the end block). But when successive blocks are scheduled, the number of possible ways of scheduling numerous successive blocks increases exponentially. What keeps the scheduling manageable is that the number of variations is limited by the length (number of pitch spaces) of the reachback; thus, only a manageable number of schedule variations need be considered at any time.

Figure 2:
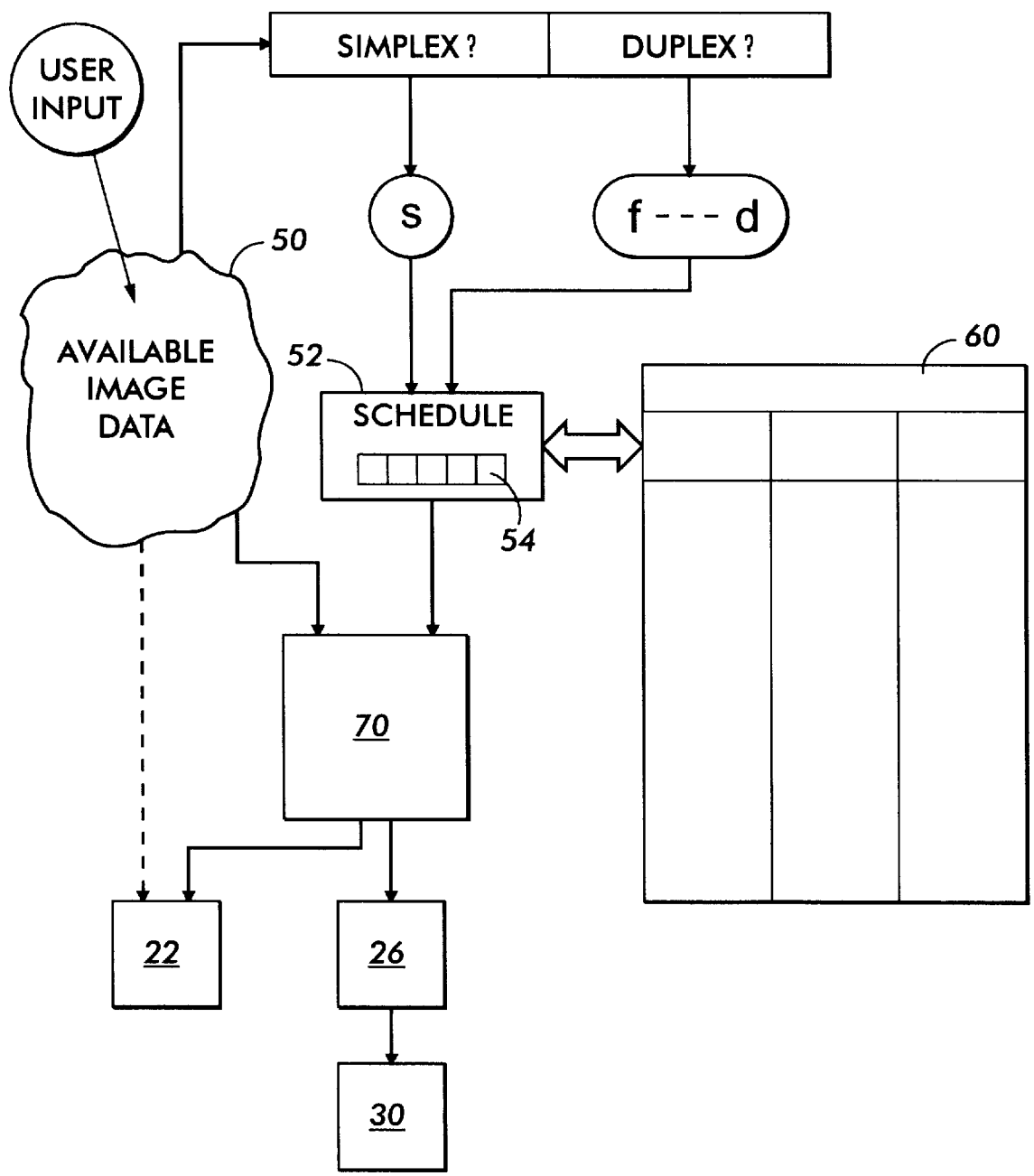
FIG. 2 is a systems diagram showing the essential parts of a control system which executes the method of the present invention.

FIG. 2 is a simplified diagram generally showing the operation of a scheduling system in a duplex-capable printing apparatus, illustrating the context of the present invention. A quantity of available image data, indicated as 50, is used to control the imager 22 to form desired images and also to indicate whether the images within the image data 50 are to be printed on sheets as simplex or duplex sheets. The ongoing list of what pitches should be assigned to the printing of which simplex or duplex images is retained in a schedule space 52, which may be manifested in any number of ways known in the art. What is important is that schedule space 52 include, in effect, a number of pitch spaces, hereshown as 54, into which blocks can be selectably placed to form a schedule.

As shown in FIG. 2, there can be placed in the pitch spaces 54 of schedule 52 either a simplex block s, corresponding to a simplex sheet image to be printed, or a duplex block f - - - d, corresponding to rendering the first and second sides of a duplex print, the duplex block having of course three blank pitches between the f and d blocks in this example. The combination of available image data 50 and the developing schedule 54 is used to operate a controller 70, which in turn operates physical elements such as gate 26 and inverter 30, along with any other physical element which requires manipulation in outputting prints, to operate the printing apparatus in accordance with the schedule developed in schedule space 52.

Also shown in FIG. 2 is the outline of a "transition table" 60. As described in detail in the patents incorporated by reference, the transition table 60 represents a closed system of possible schedule endings within a reachback, arranged as a finite-state machine, whereby the addition of a new s or f - - - d block to an existing ending of a schedule points to a new reachback, which is then used as the new ending of the developing schedule, upon which the block for the next print to be made is scheduled. In the present embodiment, such as described in detail in the patents incorporated by reference, a transition table 60 designed to operate the printing apparatus of FIG. 1 represents a finite state machine of sixteen possible endings to a schedule within a reachback of four pitches. However, as will be described below, the imposition of additional timing constraints, beyond those timing constraints imposed by the print engine and duplex loop itself, require scheduling systems which go beyond the closed system of transition table 60.

C. Added Constraints From Added Modules

Heretofore in this disclosure, the printing "apparatus" has been discussed mainly as the combination of photoreceptor belt 18 with duplex loop 16; it is this physical arrangement which determines the overall appearance of the complex block f - - - d, with its three blank pitches between its first and final blocks. The architecture such as shown in FIG. 1 also determines that the sequences of f s and d s are impermissible, because of the structure of the duplexing apparatus.

The present invention is directed to cases in which the addition of further hardware to the basic apparatus generally indicated as 10 affects the scheduling of operations within the apparatus. Returning to FIG. 1, it can be seen that there may typically exist in a printing apparatus a plurality of feed rolls 14a, 14b immediately upstream of the general printing apparatus, as well as what is here called simply a "module," indicated as 80, immediately downstream of the printing apparatus. For purposes of the present discussion, this module 80 could be one of a number of types of post-marking substrate handling devices, such as an automatic stapler, binder, or a set of mailboxes with a special routing mechanism by which a sheet output on path 28 is selectably directed to one of the mailboxes. In either case of the feed rolls 14a, 14b or the module 80 (for purposes of the claims herein, the upstream feed rolls 14a, 14b can be considered "modules" as well), these modules will have associated therewith a finite "actuation time."

The actuation time of a module is the time required for the module to be actuated in a certain way when the apparatus 10 is outputting prints. In the case of the feed rolls 14a, 14b, a type of actuation could be the changing of paper supplies, such as changing from paper stack 12a (drawn by feed roll 14a) to stack 12b (drawn by feed roll 14b). Such a change in paper supply could conceivably occur between two jobs, such as when a first job is intended to be printed on letter stock while a subsequent job is intended to be printed on legal-size stock, or could occur within a print job, such as if stack 12a comprised regular stock and stack 12b comprised heavier cover stock. With regard to downstream module 80, if the module 80 is a stapler, the actuation occurs when a certain number of sheets are fed into the module 80 where they are stacked and then stapled. If module 80 is a router, actuation would occur when the router changes position to change to which one of a set of mailboxes to direct the next output sheet.

For purposes of scheduling operations within a printing system, any kind of "actuation" of an upstream or downstream module will impose further constraints, in addition to those constraints described above, on the scheduling of simplex and duplex blocks. Typically, extra time must be provided in the schedule for the module to actuate in a particular way. For example, with regard to the feed rolls 14a, 14b, a certain amount of time will be required to change paper supplies "on the fly" if only because a certain amount of time is required for a sheet to be drawn from one stack 12a or 12b and reach duplex loop 16; a certain amount of time is needed to clear the path of sheets of a kind not needed before feeding sheets of the other kind. With regard to a downstream module 80, if the module 80 is a stapler, not only is a finite amount of time required for the stapler to staple a collected set of sheets, but it is also important that sheets from a first multi-page document to be stapled do not commingle with sheets from a second multi-page document. If the module 80 is a router which directs sheets to one or another mailbox, repositioning the router so that the router directs sheets to particular selected mailbox, it is important not to commingle sheets intended for a first mailbox with sheets intended for a second mailbox. Other types of constraints necessitated by other types of "modules," such as roll-cutters, binders, folding machines, envelope stuffers, etc., and even other printing apparatus, will be apparent.

With all of the above examples of the additional constraints placed on a scheduling system by upstream or downstream modules (including modules of types not specifically mentioned here), the finite time required for any type of actuation can be expressed in terms of blank pitches or the equivalent thereof in the time domain. For present purposes, the actuation of a particular module will be said to require a certain integral number of blank pitches to be provided in the schedule: for example, if the actuation in question is switching from paper supply 12a to paper supply 12b, let us say that the time equivalent of two pitches is required to clear the paper path from stack 12a to duplex loop 16, before sheets can begin to be fed from stack 12b. If the actuation is activating a stapler at module 80, the time equivalent of two pitches may be required to collect the sheets to be stapled, staple them, and then push the stapled set out of the way. In either case, the actuation step will require the printing apparatus 10 to withhold outputting prints for a delay of two pitches (otherwise the output of prints for the next set of sheets to be stapled will interfere with the stapling of the present set). In the case of more complicated modules, or the use of several modules at once, a necessary delay may be two, three, ten, or any number of pitches.

To take an example of how additional modules, be they upstream modules or downstream modules, can add constraints to a scheduling system, consider a case in which a first job consisting of two stapled simplex sheets, or ss, is followed by a job of two stapled duplex sheets, or dd. If there were no other module involved, the total schedule would be a simple combination of the two jobs for an output of ssdd. If each d duplex output corresponds to a f - - - d block, one possible schedule for the total output ssdd would be sff - sdd.

This schedule is very elegant, because only one blank pitch is created by the schedule, so that six images are printed in seven pitches.

However, if the two separate ss and dd jobs are desired to be printed on different types of stock, with the ss job being printed on stock from paper supply 12a and the dd job on stock from paper supply 12b, and if the transition of paper supplies requires the time equivalent of two blank pitches, the above schedule would not be able to accommodate the time necessary for switching from paper supply 12b to paper supply 12a. To change stock would require, at least, two blank pitches between the ss job and the feeding of the dd job. Therefore, in order to provide the change of stock, two blank pitches are required between any s and f.

Taking into account the two blank pitches for changing stock, an optimal schedule of the ssdd output would be ss - - - ff - - - dd.

It is clear that the change in paper supplies mandates four blank pitches within the schedule, as opposed to the one blank pitch in the schedule previously mentioned. It can be seen, in this example, how the need for time for actuation of a module significantly alters the behavior of scheduling. (It will further be noted that the necessary delays caused by module activation could be mandated either before or after the making of a print: for instance, a change in paper supply causes a fixed delay before a print is made, and stapling requires a fixed delay after a print is made.)

The additional blank pitches which are required for the operation of upstream and downstream modules can be considered "offsets" of arbitrary length which must be inserted at specific locations within a schedule. The concept of offsets has been introduced in the context of setting up a transition table, which is a closed system wherein the addition of a single simplex or duplex block to any known ending (such as the last four pitches) of an existing schedule merely points to another different ending within the table, forming a desirable closed system of a finite number of possible states within the reachback. The use of what are here called "modules" upstream and/or downstream of the printing apparatus creates a requirement that, whenever such a module is actuated, a delay of arbitrary length is required from the printing apparatus; or, in other words, an offset of an arbitrary number of blank pitches must be added to the schedule before placing the next simplex or duplex block. In the words of the claims hereinbelow, scheduling an actuation of a module results in a timing constraint on the scheduling process, and a proposed schedule must be consistent with this timing constraint; i.e. output the desired order of prints and also provide suitable delays to enable actuation of a module at the correct time.

The basic problem with the addition of arbitrary-length offsets caused by the addition of upstream and downstream modules is that the simplicity of a finite-state machine having a relatively small number of states (i.e., the finite number of possible endings within the last four pitches of a schedule) will quickly become unwieldy when arbitrary-length offsets or delays must be taken into account.

The present invention provides a system for readily taking into account arbitrary-length offsets required by actuation of upstream or downstream modules by exploiting the insight that progressively larger arbitrary-length offsets introduced into a schedule will always lead to a relatively small number of what are here called "basic states," which will be defined below. Progressively larger offsets introduced to the schedule before a "basic state" will lead to transitions to a repeating small set of other basic states. This insight allows the arbitrary-length offsets required by added modules to be taken into account relatively easily.

D. Basic States

For purposes of the following discussion, a "basic state" is defined as a last certain number of pitches in a schedule (i.e., a "reachback"), which includes only reserved pitches relating to one simplex or duplex block. In the context of the present embodiment, using letter-sized pitches and a four-pitch sized duplex loop 16, this subset of basic states would be: - - - s and - - - d. These are the only possible four-pitch endings of a schedule in which reserved pitches from only one simplex or duplex block is apparent. (Examples of states which would not be basic states include those in which blocks from more than one printed sheet are apparent, such as - d - s or - - - s d. However, in a five-pitch reachback, f - - - d would count as a basic state, if both f and d related to the same sheet. The concept also applies to complex blocks describing multiple color separations placed on a single sheet: a basic state in that context can include multiple color separations, but all the separations must relate to images placed on only one sheet.)

If the seam 19 on photoreceptor belt 18, mentioned above, is further taken into account, as it must be if multi-pitch prints are occasionally made, there would be four basic states, where / represents the seam 19 on photoreceptor belt 18: - - - /s and - - - s/ (i.e., with the seam before and after the image). Together with the two duplex block basic states within the last four pitches, - - - /d and - - - d/, there would therefore be four possible basic states within a four-pitch reachback with the apparatus shown in FIG. 1.

It can be seen that the basic states, as defined above, represent a certain subset of all possible states within the last four pitches (or whatever number of pitches the "reachback" is) of an evolving schedule. Once we know that the last set of transitions with progressively larger offsets from any state always leads to one of the basic states, we can conclude that any larger arbitrary-length offset added to the transition would simply point to another basic state, and, indeed, progressively adding pitches to this arbitrary-length offset would simply lead to a repeating pattern of the same number of basic states.

To take an example of the versatility of exploiting basic states, consider a schedule such as the ssdd example above, in which, at a particular moment in its scheduling process, ends with the state - - - ss in its last four pitches. If the next desired output from the printing apparatus is a duplex print, represented by the duplex block f - - - d, at first, the evolving schedule will have four possible options (here taking into account, as needed, the location of the seam 19, symbolized by/, on a two-pitch photoreceptor belt 18):

- - ss+f - - - d at offset=0:f - ss d/ (new state - ss d/=7) (offset=1, 2 or 3 create impermissible fs sequences or overlapping sheets)
- - ss+f - - - d at offset=4: - - ss f - - - d/ (new state - - - d/=9)
- - ss+f - - - d at offset=5: - - ss - f - - - /d (new state - - - /d=10)

(Note: the above list of three "transitions" from an original state - - s s, plus new duplex block f - - - d, at some offset o, resulting in a new state in the last four pitches forming a reachback, represent at least part of a transition table, such as described above as 60 in FIG. 2.)

It will be noted, in the above portion of a transition table, that the new states 9 and 10, which both end in - - - d, differ in that in state 9, the final print d appears just before the seam 19 on photoreceptor belt 18, while in state 10, the print d is made just after the seam 19 on photoreceptor belt 18. (In the above examples, using a two-pitch photoreceptor belt 18, the seam 19, represented by /, will of course appear after every two pitches in the schedule, but only the last seam in the series is shown, for simplicity.)

The present invention exploits the principle that addition of progressively more offsets between the s and f in the schedule simply results in a repeating pattern of state 9 and state 10 in the last four pitches of the schedule. In the following list, it can be seen that as the number of blank pitches between s and f increases from 2 to 5, only the 9 and 10 states are ever invoked in the last four pitches of the resulting schedule:

- - ss+f - - - d at offset=6: - - ss - - f - - - d/ (new state - - - d/=9)
- - ss+f - - - d at offset=7: - - ss - - - f - - - /d (new state - - - /d=10)
- - ss+f - - - d at offset=8: - - ss - - - - f - - - d/ (new state - - - d/=9)
- - ss+f - - - d at offset=9: - - ss - - - - - f - - - /d (new state - - - /d=10)

In practical terms, what is going on with the above progression of increasing offsets is as follows. Consider, for example, the case where two blank pitches are required after the feeding of the ss sheets, to enable a switch from paper supply 12a to paper supply 12b. It is apparent from the above list that the shortest schedule under these constraints is the schedule listed above having offset =6. If, however, the module or modules in the system mandated three blank pitches following the s, then the schedule having offset=7 would be required (because it has the necessary three blank pitches between the s and the f). Similarly, if, because of a certain set of actuations of various modules, a delay of five blank pitches were necessary between the s and the f, then the schedule with offset =9 would be required. However, whatever the length of the necessary delay between the s and the f in the above schedules, the last four pitches in the resulting schedule will always "end up" as equal either the state 9 or state 10, as shown; further, the two states will alternate with every added pitch of delay.

With the present invention, an extra transition table need not be created, or the existing one extended, in order to take into account the new constraints created by the actuation of a module. Instead, the existing finite state machine (summarized by transition table 60, or in the first three transitions with offsets 0, 4, and 5 described above) contains all the transitions that are needed. The present invention exploits the insight that for each capability the last few transitions in the transition table, those that can be identified as leading to basic states, can be used to take into account arbitrary-length delays in the schedule caused by actuation of modules beyond the basic print engine.

E. An Algorithm for Scheduling with Basic States

In the following discussion, the above example of scheduling an ss document followed by a dd document will be repeated using a special convention, and the variables in this convention can be readily applied to an algorithm.

Every transition for printing one simplex or duplex sheet from one state to the next in a schedule can be summarized as <s,i,o,t>, where s=the index number of the state before the transition (this is a different s from that used to designate a simplex block);

i=the capability, that is, the simplex or duplex block representing the next sheet to be scheduled;

o=the offset, or the number of blank pitches to be placed between the last available block in the schedule before the transition and the d or s of the next block to be scheduled; and t=the index number of the state in the new schedule, after the next block has been added, with a offset o, to the schedule (i.e., after the transition is completed). The new state t becomes the next state s when the next sheet is scheduled.

In a transition table, such as shown in the patent incorporated by reference, there would be an input of a state s and a capability i, which together lead to a new state t and an offset o. Further under this convention, let the set of all possible pairs of new states t and offsets o, given an existing state s at the end of a schedule and a capability i, be known as T.

Further under this algorithm, let $b_i$=a finite number of distinct possible basic states, given a capability i and a reachback. In this example, the reachback is four pitches, determined by the length of duplex loop 16. In this example, there are two capabilities, simplex block s (capability 1) and duplex block f - - - d (capability 2). As explained above, the number of basic states possible with each type of capability is $b_1$=2 (two basic states with simplex blocks, - - - /s and - - - s/,) and $b_2$=2 (two basic states with duplex blocks, - - - /d and - - - d/).

$o_i$=a maximum offset given a capability i, calculated as $o_i = r_{max} + \max(0, p-(r_{max}-r_i+g))$, where $r_i$ is the reachback of capability i, $r_{max}$ is the maximum of all $r_i$, g is the granularity factor, and p is the period (p=g if no period is imposed).

With reference to the above example, such as the overall print engine architecture shown in FIG. 1, $r_1$=1 (reachback of a simplex block s) and $r_2$=4 (reachback of a duplex block f - - - d): $r_{max}=\max(r_1,r_2)=4$ (largest reachback of all capabilities, which also determines the state length); p=2 (the period is given by the photoreceptor belt 18, which is a two-pitch belt in the example); g=1 (one pitch is the unit of measurement). Thus, $o_1$=4+max(0,2−(4−1+1))=4, and $o_2$=4+max(0,2−(4−4+1))=5. Notice that 5 is indeed the largest offset for duplex in the example of transitions above.

With reference to setting g=1 pitch, the pitch being the unit of measurement, it will be noted that in the context a "pitch" is ultimately a unit of length which happens to correspond to the size of one letter-size sheet. It will be apparent that other units of length, such as millimeters, may be desirable in some instances, or even units of time. Thus, while the claims recite "pitches" and "pitch spaces," it will be recognized that organizing a schedule space by millimeters or milliseconds, which can be filled with blocks of a certain linear length or duration, are equivalents to the recited elements.

When creating a finite state machine transition table that can take into account basic states, a finite state machine generator can generate, for a given original state s and capability i, a list of transitions from offset, =0 to $o_i$. The above formula for $o_i$ guarantees that the last bi transitions result in basic states.

According to one embodiment of the present invention, when building a schedule for outputting a series of simplex and duplex printed pages, with every new simplex or duplex sheet (capability 1 or 2) to be scheduled, a set of extensions T is generated from the state s at the end of the previous schedule, each extension having the necessary capability i, spaced from the state s by an offset o number of pitches. Then, once a set of extensions T is generated, the extensions are proposed, that is, checked to see if the extension is constant with the desired output and timing constraints. Those extensions which are inconsistent with the run-time constraints are removed from T. More details about this "extending and pruning" technique are given in U.S. patent application Ser. No. 08/787,188, incorporated by reference herein.

The following discussion is a description of how a scheduler, finding no consistent transitions in a regular transition table (i.e., T is empty because an arbitrary-length delay of a certain number of pitches is mandated by an external module), can "cycle through" the identified basic states until a suitable schedule ending is reached, as described in the previous section. Input to the algorithm is scheduling state s and desired capability i. In the following, it is assumed that the states are labeled by an index (from 1 through the total number of distinct states), and the transitions are labeled by an index j (from 1 through the total number of transitions). Furthermore, the transitions for each state s and capability i are sorted by increasing offset.

Let $j_{max}$=the index of transition <s,i,$o_i$,_> (i.e., the transition from state s for capability i with the largest offset). Note that in the transition table, both states and transitions are simply numbered. If there is a total number of n transitions, they will be numbered from 1 through n. If there is a total number of m states, they will be numbered from 1 through m. This number is called an index. When state - - - d/=9 above, it means that state - - - d/ has index 9.

d=a pitch count updating variable (this is a different d than the duplex block)

On the first attempt to find a suitable schedule extension given a desired new capability i, let d=p (the period, as described above)

$j=j_{max}-b_i+1$

If no suitable extension was found using the finite state machine as disclosed in the patent incorporated by reference above, then the scheduler generates further permissible extensions by iterating the value of j by ones up to $j_{max}$, to generate an extension set T such that T={<t, d+o>|<s,i,o,t> is the transition with index j} when the iterated $j=j_{max}$, then set d=d+p, and calculate $j=j-b_i+1$

If T, after being pruned by further module constraints, is still empty, this latter series of steps to create T is repeated, until T is not empty. This creation of extension set T in effect repeatedly uses the transition table having only basic states therein.

The above discussion in fact ties into the extensions described in the previous section. Consider, once again, the transitions derived from the basic transition table in the example in the previous section: transition j=20:

- - ss+f - - - d at offset=0: f - ss d/ (new state - ss d/=7) (offset=1, 2 or 3 create impermissible states) transition j=21:

- - ss+f - - - d at offset=4: - - ssf - - - d/ (new state - - - d/=9) transition j=22:

- - s+f - - - d at offset=5: - - ss - f - - - /d (new state - - - /d=10)

In this example, the index of the first transition is 20, and the value of $J_{max}$ is 22.

After applying the transitions once (on the first, normal attempt), j will be set to $j_{max}-b_i+1=22-2+1=21$, and d will be set to p=2 (i.e., the number of pitches of the belt). As seen above, T will be {<7,0>,<9,4>,<10,5>}; in this convention, T{<t, o>}, were t is the new state and o is the offset. It can be seen in the above set of transitions how the offset, such as 0 in the first example, yields a new state 7.

If it is found that none of the transitions created by the basic scheduler is consistent with, for instance, the arbitrary delay in pitch spaces required by an additional module, the scheduler can generate new transitions, having these arbitrary delay, by cycling through the last bi states (states 21 and 22 in the example) as described above.

On the next attempt, T will become {<9,6>,<10,7>} (i.e., it contains end states 9 and 10, but now with offsets d+o=2+4=6 and d+o=2+5=7, respectively, where o is the offset of transitions 21 and 22, respectively), d will become d+p=4, and j will become j−bi+1=21.

On the next attempt, T will become {<9,8>,<10,9>} (i.e., it contains end states 9 and 10, but now with offsets d+o=4+4=8 and d+o=4+5=9, respectively, where o is again the offset of transitions 21 and 22, respectively), d will become d+p=6, and j will become 22.

Thus, the scheduling method cycles through the last two transitions, takes their end states, and adds to their offsets the d, which keeps increasing by period p whenever the last transition is reached.

The above algorithm, when generating further extensions T, instead of using all $b_i$ transitions per attempt, could also use just one transition per attempt, or more than $b_i$ transitions, as desired.

F. The Overall Scheduling Process

Figure 3:
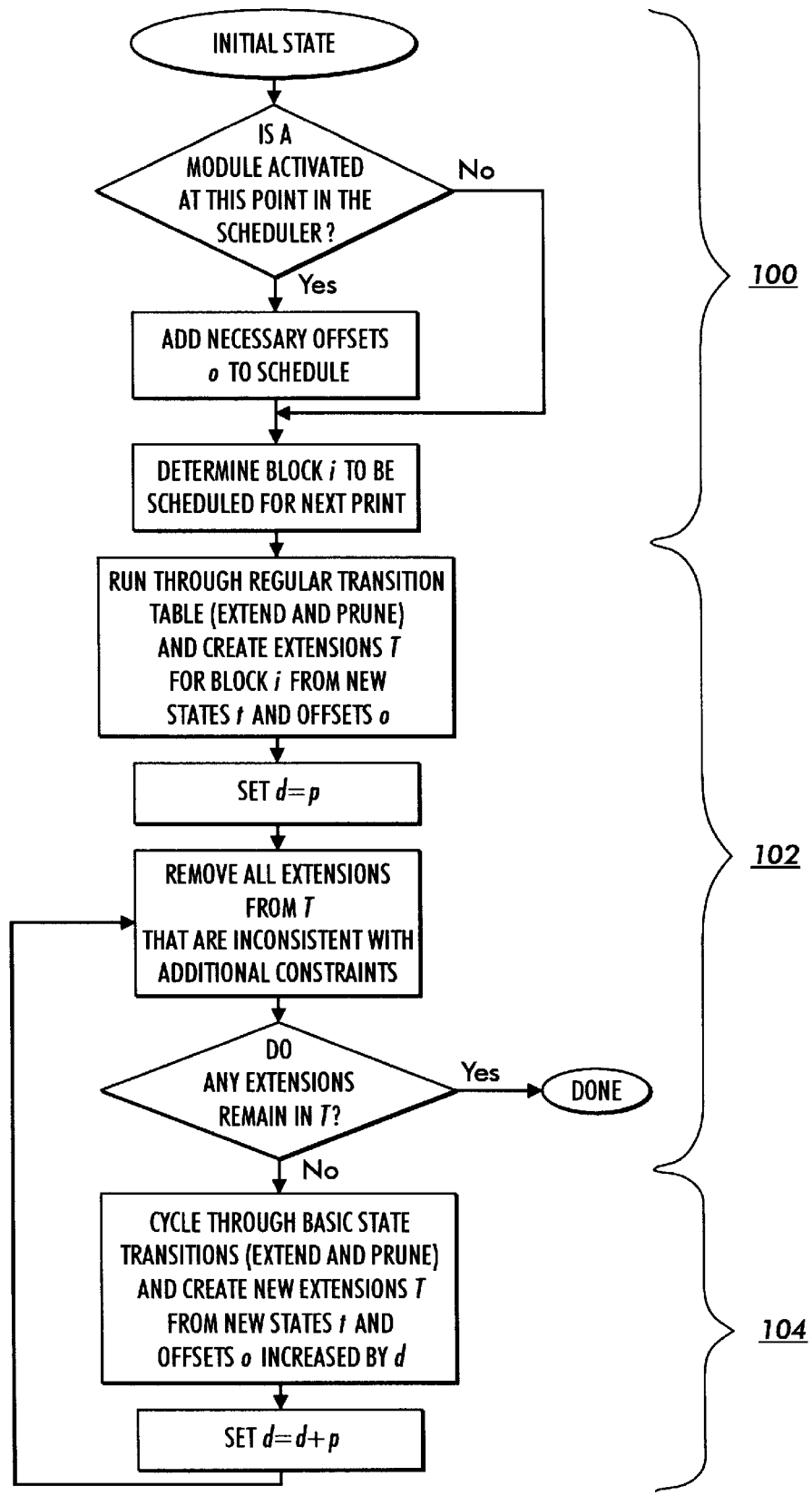
FIG. 3 is a flowchart showing a preferred embodiment of the method of the present invention.

FIG. 3 is a flowchart summarizing the above-described scheduling steps according to the present invention. As can be seen in the flowchart of FIG. 3, there are three basic sections to a preferred embodiment of the method. Section 100 in FIG. 3, shows how a scheduled actuation of a module, such as a stapler, mailbox, or change in paper supply, mandates adding necessary offsets to a developing schedule, either just before, just after, or in some other fixed relationship to a block representing a new print to be printed. At section 102 in the flowchart, the basic transition table, that is, the transition table 60 forming a closed system of a finite number of possible endings of a schedule within a reachback, is first invoked to see if one of the schedule endings within the transition table 60 is capable of being consistent with both the block i representing the new print to be printed and the necessary offsets in the schedule mandated by actuation of a module, if any. In brief, section 102 merely recapitulates the basic consultation of transition table 60 described, for example, in U.S. Pat. No. 5,504,568, incorporated by reference above.

Section 104 in FIG. 3 represents the steps which occur in the scheduling process when it is found that none of the possible scheduling endings within the transition table 60 is in itself consistent with the necessary print to be output and the necessary offsets. The steps in section 104 recapitulate what has been described above in detail, in brief carrying out a process by which basic states, which may have been identified from within the original transition table, are used to develop schedule extensions which may be consistent with the desired output. The steps of incrementing the value d have the effect of incrementing the number of blank pitches or offsets between the end of the existing schedule (the initial state) and one or another basic state. In effect, additional blank pitches are added before the basic state repeatedly, until a consistent extension, which satisfies both the desired output block i and the necessary offsets required by module actuation, is found. As can be seen by the creation of an extension set T, and the subsequent removal of extensions T of inconsistent extensions, in a preferred embodiment of the present invention, the overall purpose is to generate a set of possibly-consistent extensions, and then remove those extensions later found to be inconsistent.

While the invention has been described with reference to the structure disclosed, it is not confined to the details set forth, but is intended to cover such modifications or changes as may come within the scope of the following claims.

What is claimed is:

1. A method of developing a schedule for operations in an apparatus for outputting prints, the apparatus including at least one module which is occasionally activated incidental to outputting prints, comprising the steps of:

providing a schedule space defining a series of pitches, the apparatus being capable of performing an operation within each pitch;

for each print to be output, creating at least one possible schedule extension ending in a basic state, each schedule extension including a block representative of the print to be output and a predetermined offset relative to an ending of a schedule of previously-scheduled blocks in the schedule space, a basic state being an ending of the schedule having reserved pitches related to only one print to be output within a reachback of a predetermined length;

proposing a first new possible schedule extension having a first predetermined offset between the previously-scheduled blocks in the schedule space and the basic state; and determining whether the first new possible schedule extension is consistent with outputting the print in view of a timing constraint, the timing constraint being a delay of predetermined length in a fixed relationship with outputting the print, the timing constraint being caused by actuation of the module associated with the apparatus.

2. The method of claim 1, further comprising the steps of proposing a second new possible schedule extension having a second predetermined offset between the previously-scheduled blocks in the schedule space and the basic state; and determining whether the second new possible schedule extension is consistent with outputting the print in view of the timing constraint.

3. The method of claim 1, further comprising the steps of incrementing the offset between the previously-scheduled blocks in the schedule space and the basic state, thereby yielding a new schedule extension;

proposing the new possible schedule extension; and determining whether the new possible schedule extension is consistent with outputting the print in view of the timing constraint.

4. The method of claim 1, further comprising the steps of for each print to be output, creating a table comprising possible schedule extensions;

determining whether one of the possible schedule extensions in the table is consistent with outputting the print in view of the timing constraint; and identifying, within the table, at least one schedule extension ending in a basic state.

5. The method of claim 1, in an apparatus for outputting simplex prints having one image thereon and complex prints having a plurality of images thereon, the entering step including the steps of for each simplex print to be output, entering to the schedule space a simplex block indicative of printing the simplex print;

for each complex print to be output, entering to the schedule space a complex block indicative of printing the complex print, the complex block including at least a first block indicative of printing a first image, a final block indicative of printing a second image, and a blank pitch indicative of a time delay between the first block and the final block, the blank pitch being available for entry of a further block therein.

6. A method of developing a schedule for operations in an apparatus for outputting prints, the apparatus including at least one module which is occasionally activated incidental to outputting prints, comprising the steps of:

providing a schedule space defining a series of pitches, the apparatus being capable of performing an operation within each pitch;

for each simplex print to be output, entering to the schedule space a simplex block indicative of printing the simplex print;

for a step of actuating the module associated with the apparatus, entering into the schedule space at least one offset pitch representative of a delay in operation of the apparatus caused by activation of the module.

7. The method of claim 6, the step of actuating a module being stapling a set of prints output by the apparatus.

8. The method of claim 7, the step of actuating a module being changing from a first paper supply to a second paper supply.

9. The method of claim 7, the step of actuating a module being positioning a router which directs a sheet to a predetermined location.

10. The method of claim 6, in an apparatus for outputting simplex prints having one image thereon and complex prints having a plurality of images thereon, the entering step including the step of for each complex print to be output, entering to the schedule space a complex block indicative of printing the complex print, the complex block including at least a first block indicative of printing a first image, a final block indicative of printing a second image, and a blank pitch indicative of a time delay between the first block and the final block, the blank pitch being available for entry of a further block therein.

11. The method of claim 6, further comprising the steps of for each print to be output, creating at least one possible schedule extension ending in a basic state, each schedule extension including a block representative of the print to be output and a predetermined offset relative to an ending of a schedule of previously-scheduled blocks in the schedule space, a basic state being an ending of the schedule having only a block related to only one print to be output within a reachback of a predetermined length;

proposing a first new possible schedule extension having a first predetermined offset between the previously-scheduled blocks in the schedule space and the basic state; and determining whether the first new possible schedule extension is consistent with outputting the print in view of the at least one offset pitch resulting from the actuating step.

12. The method of claim 11, further comprising the steps of proposing a second new possible schedule extension having a second predetermined offset between the previously-scheduled blocks in the schedule space and the basic state; and determining whether the second new possible schedule extension is consistent with outputting the print in view of the at least one offset pitch resulting from the actuating step.

13. A method of developing a schedule for operations in an apparatus for outputting prints, the apparatus including a rotatable belt including a seam, comprising the steps of:

providing a schedule space defining a series of pitches, the apparatus being capable of performing an operation within each pitch;

for each print to be output, entering to the schedule space a block indicative of printing the print; and generating at least a first proposed extension and a second proposed extension to the schedule of operations, the first proposed extension describing the seam being in a first position relative to a block, and the second proposed extension being identical to the first proposed extension but for describing the seam being in a second position relative to the block.

14. The method of claim 13, further comprising the step of retaining the first proposed extension and the second proposed extension in a transition table.

15. The method of claim 13, in an apparatus for outputting simplex prints having one image thereon and complex prints having a plurality of images thereon, the entering step including the step of for each complex print to be output, entering to the schedule space a complex block indicative of printing the complex print, the complex block including at least a first block indicative of printing a first image, a final block indicative of printing a second image, and a blank pitch indicative of a time delay between the first block and the final block, the blank pitch being available for entry of a further block therein.

* * * * *